(12) United States Patent  
Najima

(10) Patent No.: US 7,819,445 B2  
(45) Date of Patent: Oct. 26, 2010

(54) HANDLE UNIT

(75) Inventor: Masahiro Najima, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 38 days.

(21) Appl. No.: 12/216,482

(22) Filed: Jul. 7, 2008

(65) Prior Publication Data  
US 2009/0008950 A1    Jan. 8, 2009

(30) Foreign Application Priority Data  
Jul. 6, 2007   (JP) ............................ P2007-179087

(51) Int. Cl.  
E05B 3/00  (2006.01)

(52) U.S. Cl. ............................ 292/336.3; 292/DIG. 30; 292/DIG. 31; 292/DIG. 38; 292/143

(58) Field of Classification Search ............. 292/336.3, 292/DIG. 30, DIG. 31, DIG. 38, 143, 200  
See application file for complete search history.

(56) References Cited  
U.S. PATENT DOCUMENTS 5,011,202 A * 4/1991 Kato et al. ............... 292/336.3  
5,263,750 A * 11/1993 Smith et al. ............... 292/336.3  
5,794,994 A * 8/1998 Miyagawa et al. ........ 292/336.3  
6,152,501 A * 11/2000 Magi et al. ................ 292/336.3  
6,719,332 B2 * 4/2004 Sekulovic ................... 292/170

* cited by examiner

*Primary Examiner*—Peter M. Cuomo  
*Assistant Examiner*—Mark Williams  
(74) *Attorney, Agent, or Firm*—McGinn IP Law Group, PLLC

(57) ABSTRACT

According to an aspect of the present invention, there is provided a handle unit including: a main body including: a pair of bearings; and a pair of holding walls separated from the pair of the bearings; a handle including: a pair of support walls; and a pair of rotational shafts projecting outward from the pair of support walls to be engaged with the pair of the bearings, wherein the handle is rotatable between a stored position and a operating position, wherein the support walls are formed to not face the holding walls when the handle is in the stored position, and formed to face the holding walls and contact the holding walls by being deflected when the handle is in the operating position.

17 Claims, 8 Drawing Sheets

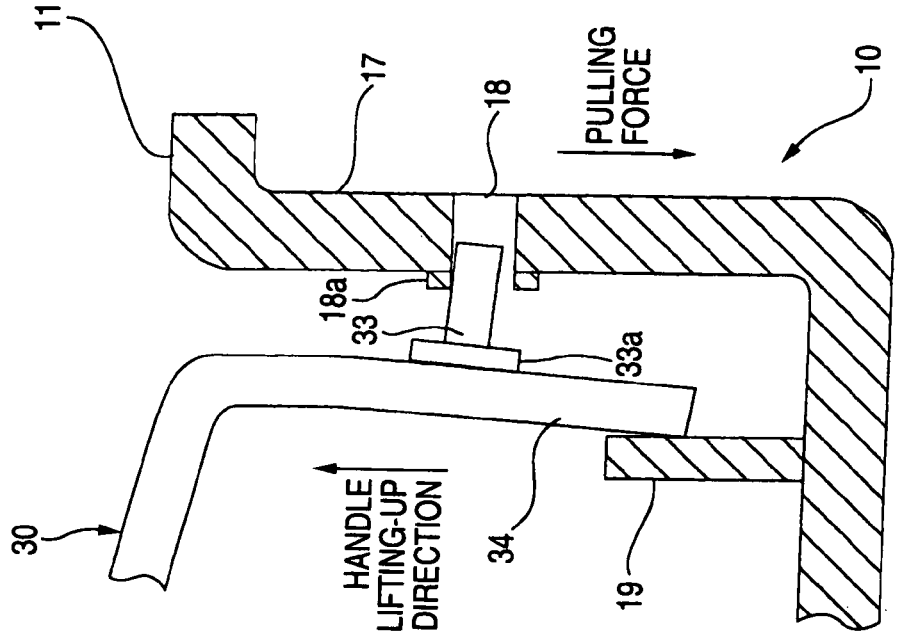
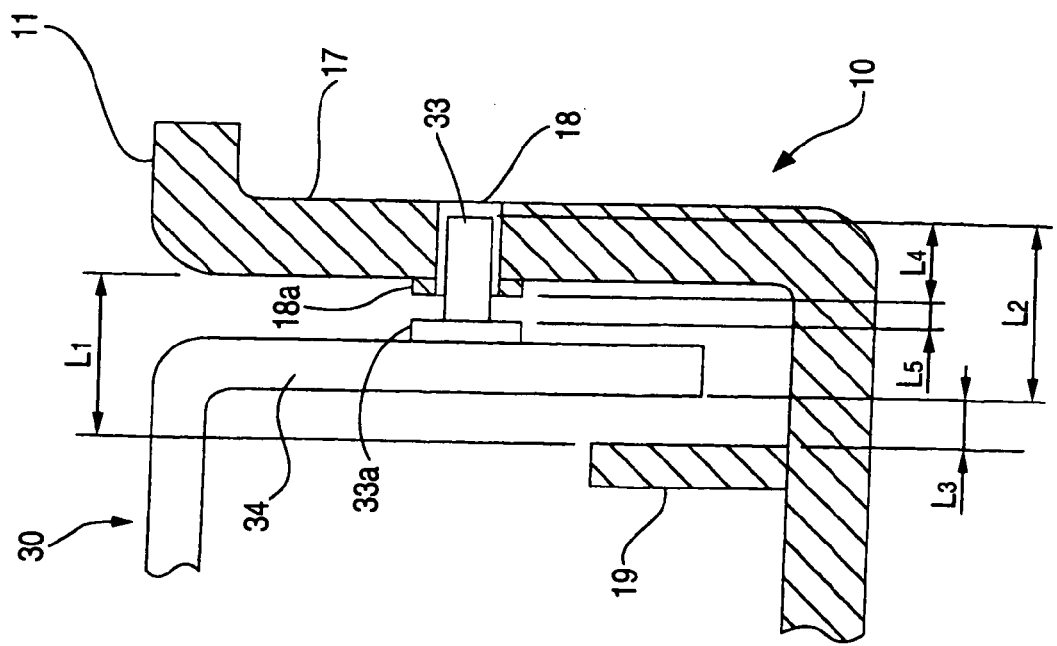

HANDLE UNIT

HANDLE UNIT

CROSS-REFERENCE TO RELATED APPLICATIONS

This application claims priority from Japanese Patent Application No. 2007-179087 filed on Jul. 6, 2007, the entire contents of which are incorporated herein by reference.

BACKGROUND OF THE INVENTION

1. Field of the Invention

An aspect of the present invention relates to a handle unit which is attached to a trunk board which closes an accommodation space within a luggage compartment of an automotive vehicle for use in opening and closing the trunk board.

2. Description of the Related Art

In general, a storage space for storing a spare tire and/or a tool set is provided under a floor of a luggage compartment of an automotive vehicle. As shown in FIG. 8, an upper opening of this storage space is closed by a floor board called a trunk board 1. A handle unit is attached to the trunk board 1 for lifting up the trunk board 1 by gripping a handle 30 of the handle unit to open the upper opening of the storage space.

Conventionally, there are many handle units in which a main body and a handle are connected to each other with a single metallic pin. The handle which is rotatably attached to the main body with the metallic pin does not come off the main body even when the handle is subjected to a large pulling force and has the strength that can withstand a long-term usage. Since the independent part such as the metallic pin is necessary, however, the number of parts involved is increased, and the assembling work and part management become complex and troublesome, leading to a problem that the product costs are increased.

To cope with this, there have conventionally been proposed handle units in which, instead of using the metallic pin, rotational shafts are formed integrally on a handle, one of which is disclosed in U.S. Pat. No. 6,719,332. In a latch unit described in U.S. Pat. No. 6,719,332, as is shown in FIGS. 3A to 3C and 7A to 7B of the same document, a pair of rotational shafts (projections) projects from external sides of a handle, and the handle can easily be assembled to a housing by inserting the rotational shaft into bearings (openings) formed in the housing.

In the configuration disclosed in U.S. Pat. No. 6,719,332 above, however, when the handle is gripped to lift up a trunk board, the force with which the handle is pulled up is applied on the rotational shafts. In general, a trunk board is heavy, and when the trunk board is attempted to be lifted up, a strong pulling force is applied on the rotational shafts, and arm portions of the handle which are linked with the rotational shafts are deflected by the pulling force. As a result of this, the rotational shafts are shifted in a direction in which they come off the bearings, leading to a fear that the rotational shafts are dislocated from the bearings.

SUMMARY OF THE INVENTION

An object of the present invention is to provide a handle unit which can realize a reduction in the number of parts by integrally forming rotational shafts on a handle and which can be free from a fear that the rotational shafts are dislocated from bearings even though a large pulling force is applied on the handle.

According to a first aspect of the present invention, there is provided a handle unit including: a main body including: an inner wall; a pair of bearings that are formed on the inner wall at both sides; and a pair of holding walls that are formed so as to be separated from the pair of the bearings, respectively; a handle including: a pair of support walls; and a pair of rotational shafts that project outward from the pair of support walls, respectively, and are engaged with the pair of the bearings, respectively, wherein the handle is mounted on the main body to be rotatable in a range from a stored position to a operating position, wherein each of the pair of holding walls and a corresponding one of the pair of support walls are formed so as to not face each other when the handle is in the stored position, and so as to face each other when the handle is in the operating position, and wherein, when the handle is in the operating position, each of the pair of the support walls contact the corresponding one of the pair of the holding walls by being deflected.

According to a second aspect of the present invention, a length between each holding wall and the corresponding side of the inner wall may be set smaller than a length from each supporting wall at a side facing the corresponding holding wall to a distal end of the corresponding rotational shaft.

According to a third aspect of the present invention, a length between each support wall and the corresponding holding wall may be set smaller than an inserted amount of each rotational shaft into the corresponding bearing.

According to a fourth aspect of the present invention, a length between each support wall and the corresponding holding wall may be set larger than a length from a proximal end of each rotational shaft to the corresponding bearing.

According to a fifth aspect of the present invention, the main body and the handle may be mold-formed of a resin. On the support wall, a first bearing surface having a flat shape may be formed to surround a proximal end of the rotational shaft. On the inner wall, a second bearing surface having a flat shape may be formed to surround a periphery of the bearing.

According to a sixth aspect of the present invention, the main body may include a spring support piece that is mono-lithically formed with the main body to intersect with a line connecting the pair of bearings.

According to the first aspect of the present invention, since the rotational shafts are formed integrally on the support walls of the handle, the number of parts is reduced, and the assembling work and part management can be simplified, whereby the product costs can be reduced. Moreover, even though a strong pulling force is applied on the rotational shafts to generate deflection in the support walls and the support walls are displaced in the axial direction, since the holding walls are brought into contact with the support walls from inside to regulate the deformation of the support walls, there is caused no fear that the rotational shafts are dislocated from the bearings.

In addition, since the positions where the support walls and the holding walls are formed are adjusted such that the support walls do not face the holding walls when the handle is in the stored position, the handle is pushed into the main body so that the handle is received in the stored position, and during this process, the rotational shafts can be inserted into the bearings while the support walls are deflected, thereby the assembling work of the handle to the main body being facilitated.

In particular, through the configurations according to the second and third aspects of the present invention, even though the strong pulling force is applied on the rotational shafts, generating deflection in the support walls, since the holding walls are brought into contact with the support walls from inside so as to regulate the deformation of the support walls before the rotational shafts are dislocated from the bearings, the dislocation of the rotational shafts from the bearings can be surely prevented.

According to the fourth aspect of the present invention, the length between the proximal end of the rotational shaft and the opening of the bearing regulates the play of the rotational shaft in the axial direction. By making this length smaller than the length between the facing sides of the holding wall and the support wall, even though the rotational shaft shifts in the axial direction, since the shift is restricted before the support wall reaches the holding wall, a fear can be eliminated that wear due to the contact of both the walls and uncomfortable striking noise in association with the collision of both the walls are generated, and a good operability can be obtained.

Further, when the respective constituent parts of the handle unit are molded from a resin, in general, the machining accuracy of portions corresponding to corner portions such as the periphery of the proximal end of the rotational shaft and the periphery of the opening of the bearing is decreased. To cope with this, according to the fifth aspect of the present invention, the flat bearing surfaces are formed to project from the periphery of the proximal end of the rotational shaft and the periphery of the opening of the bearing, so as to regulate the play of the rotational shaft in the axial direction between the bearing surfaces, thereby making it possible to adjust the play with high accuracy.

According to the sixth aspect of the present invention, a torsion coil spring is mounted on the spring support piece, so that the handle can be configured to return from the operating position to the stored position by the urging force of the torsion coil spring. Since the spring support piece is formed integrally with the main body, there is caused no situation in which the number of constituent parts is increased.

BRIEF DESCRIPTION OF THE DRAWINGS

These and other objects and advantages of this invention will become more fully apparent from the following detailed description taken with the accompanying drawings in which:

FIGS. 1a and 1b are perspective views showing an overall configuration of a handle unit according to an embodiment of the present invention, of which FIG. 1A is a view showing a state in which a handle is in a stored position, and FIG. 1B is a view showing a state in which the handle is in an operating position;

FIGS. 3A to 3C are development views showing the handle of the handle unit according to the embodiment, of which FIG. 1A is a top view, FIG. 1B is a rear view, and FIG. 1C is a side view of the handle;

FIGS. 4A to 4C are development views showing a main body of the handle unit according to the embodiment, of which FIG. 4A is a top view, FIG. 4B is a side view, and FIG. 4C is a sectional view taken along the line A-A in FIG. 4A;

FIGS. 5A to 5C are sectioned side views showing rotating positions of the handle of the handle unit according to the embodiment, of which FIG. 5A is a view showing the handle being in the stored position, FIG. 5B is a view showing the handle being exposed from the stored position, and FIG. 5C is a view showing the handle in the operating position;

FIGS. 6A and 6B are drawings showing a relationship between a rotational shaft and a bearing of the handle unit according to the embodiment, of which FIG. 6A is an enlarged perspective view, and FIG. 6B is an enlarged sectional view;

FIGS. 7A and 7B are enlarged sectional views showing a relationship between the rotational shaft and the bearing when the handle of the handle unit according to the embodiment is in the operating position, of which FIG. 7A shows a state in which an external force is not applied on the handle in a direction in which the handle is pulled upwards, and FIG. 7B shows a state in which the external force is applied on the handle in the direction in which the handle is pulled upwards.

DETAILED DESCRIPTION OF THE EMBODIMENTS

Hereinafter, an embodiment of the present invention will be described in detail by reference to the drawings.

Figure 1A:
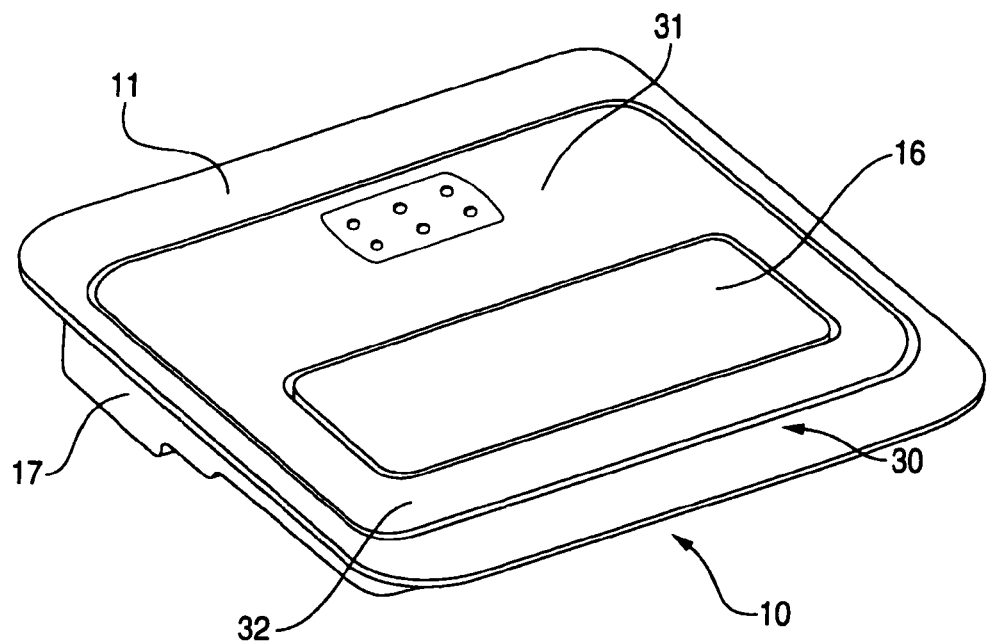
Figure 1B:
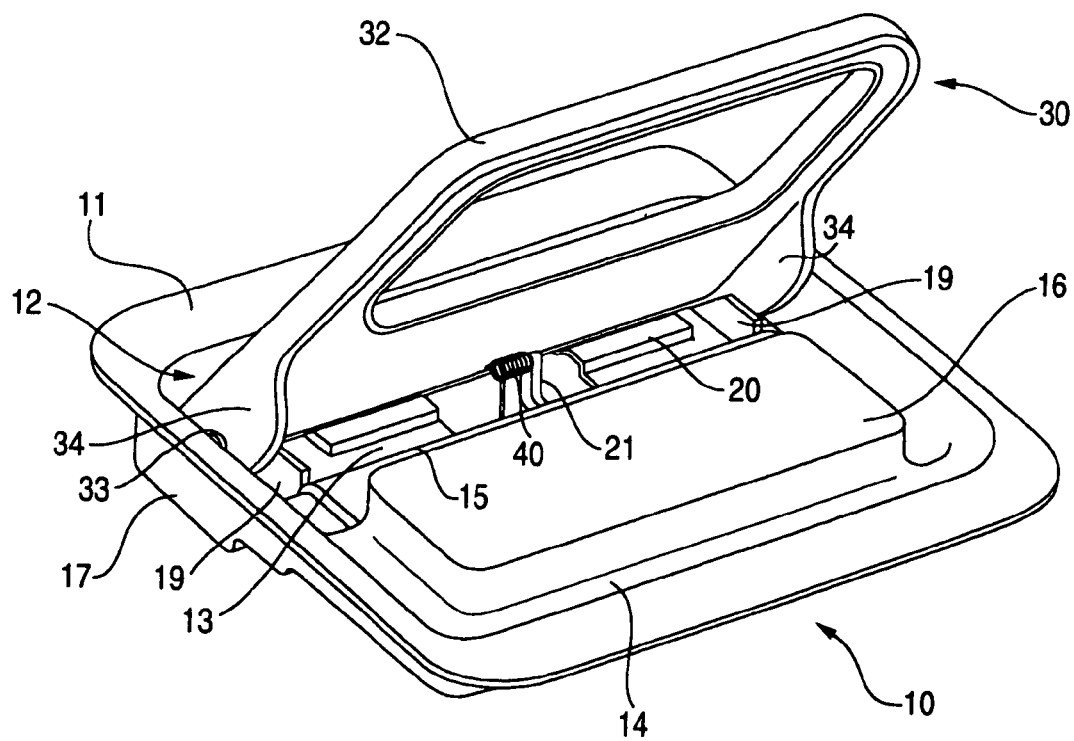
Figure 2:
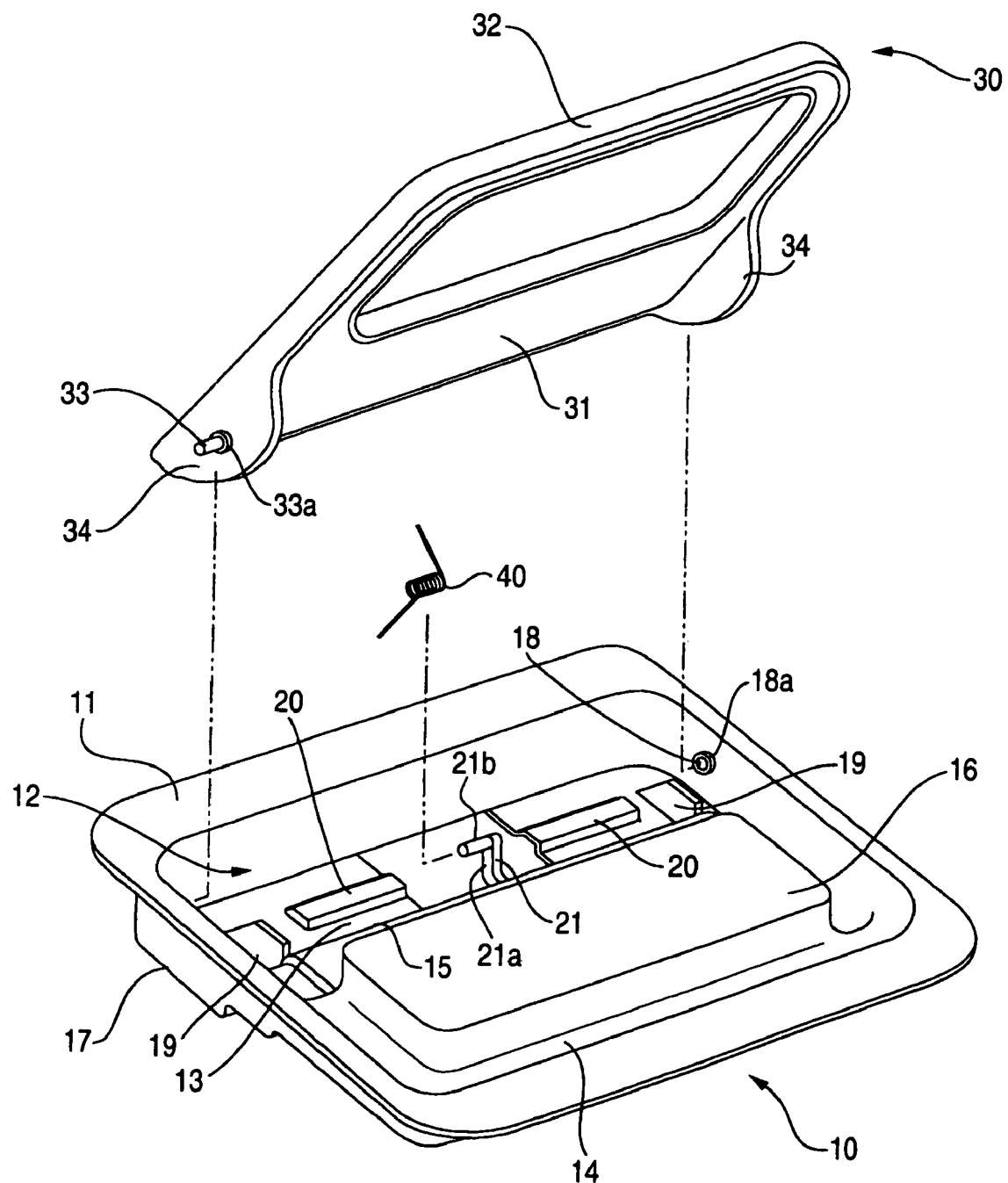
FIG. 2 is an exploded perspective view showing the overall configuration of the handle unit according to the embodiment.

FIGS. 1a to 7b are drawings showing a handle unit according to the embodiment. FIGS. 1A and 1B are perspective views showing an overall configuration of the handle unit according to the embodiment, and FIG. 2 is an exploded perspective view showing the overall configuration of the same handle unit.

As is shown in FIGS. 1A to 2, the handle unit of the embodiment includes a main body 10 which is attached to a portion of a trunk board 1 to which the main body 10 is designed to be attached and a handle 30 which is attached to the main body 10 and is adapted to rotate freely within a preset range from a stored position to an operating position. FIG. 1A shows a state in which the handle 30 is in the stored position, while FIG. 1B shows a state in which the handle 30 is in the operating position. As will be described later, the handle 30 is normally disposed in the stored position by the urging force of a torsion coil spring.

In addition, the main body 10 and the handle 30 are resin molded products made from a synthetic resin, such as plastic.

Figure 8:
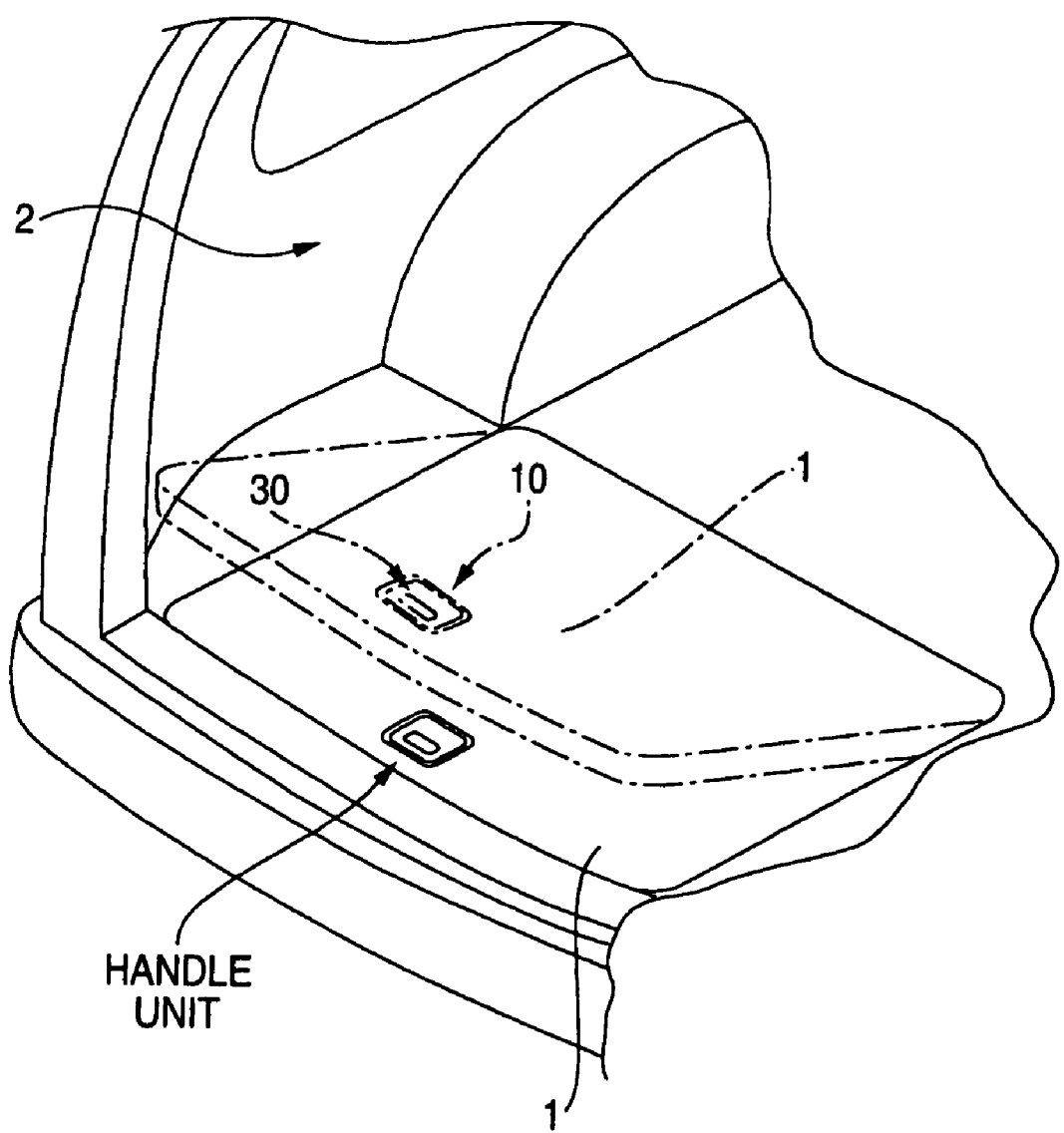
FIG. 8 is a drawing showing the handle unit attached to a trunk board of an automotive vehicle.

As is shown, for example, in FIG. 8, the handle unit is attached to a position which lies in the vicinity of the center of one side edge of the trunk board 1 which closes a storage space under a floor 2 of a luggage compartment of an automotive vehicle. This trunk board 1 normally closes an opening of the storage space, and the opening of the storage space can be opened by the handle 30 of the handle unit being gripped and pulled up so as to lift up the trunk board 1 from the closed state.

Figure 3A:
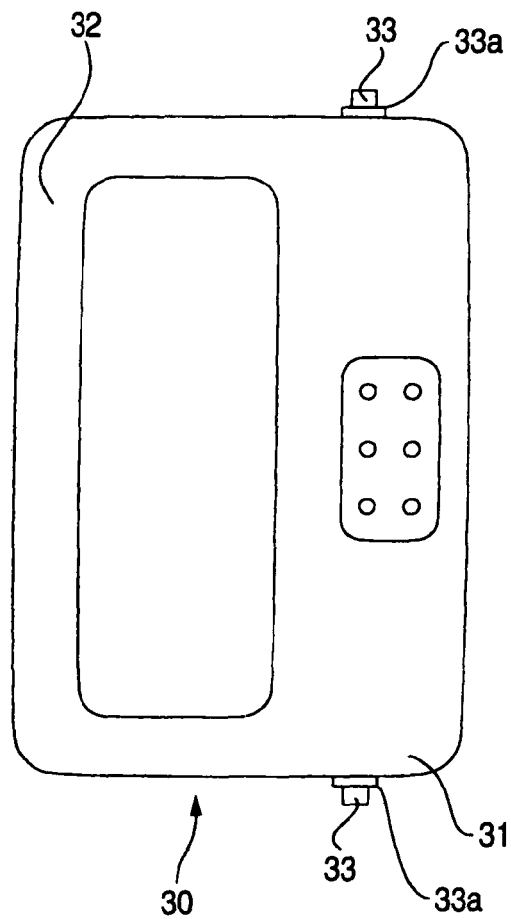
Figure 3B:
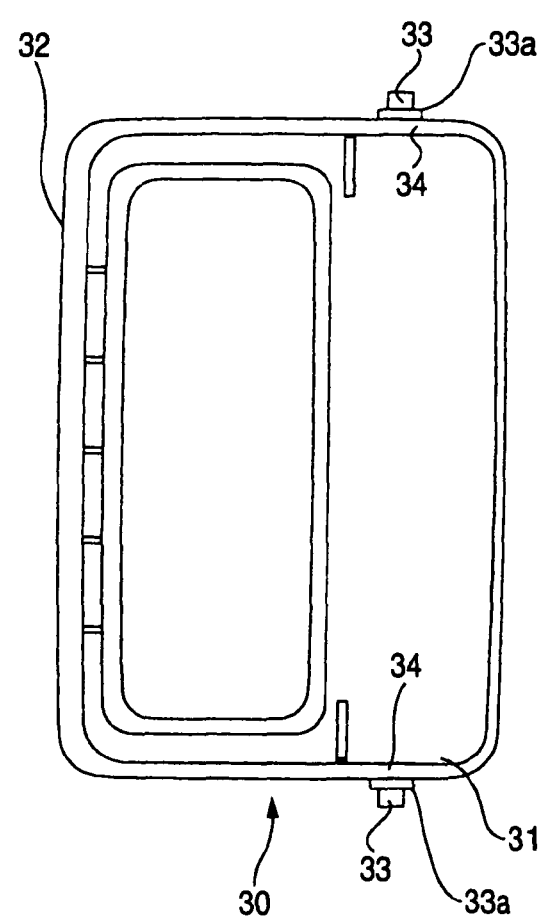
Figure 3C:
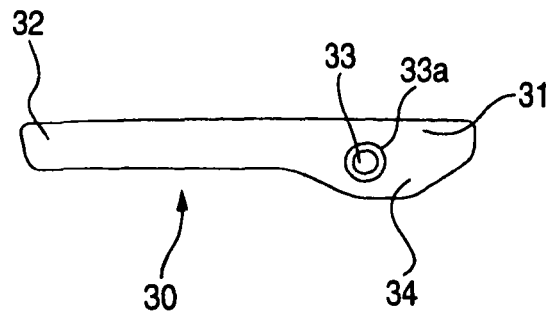

FIGS. 3A to 3C are development views showing the handle of the handle unit according to the embodiment, of which FIG. 3A is a top view, FIG. 3B is a rear view and FIG. 3C is a side view of the handle.

As is shown in FIGS. 2 to 3C, the handle 30 of the handle unit has a proximal end portion 31 which is pivotally supported on the main body 10 and an operating portion 32 which continues from the proximal end portion 31 and which is opened in the center thereof. On the proximal end portion 31 of the handle 30, a pair of support walls 34 that extend downwardly from respective side edges of the proximal end portion 31 and a pair of rotational shafts 33 that project outwardly from respective exterior side of the support walls 34 are formed integrally.

Figure 4A:
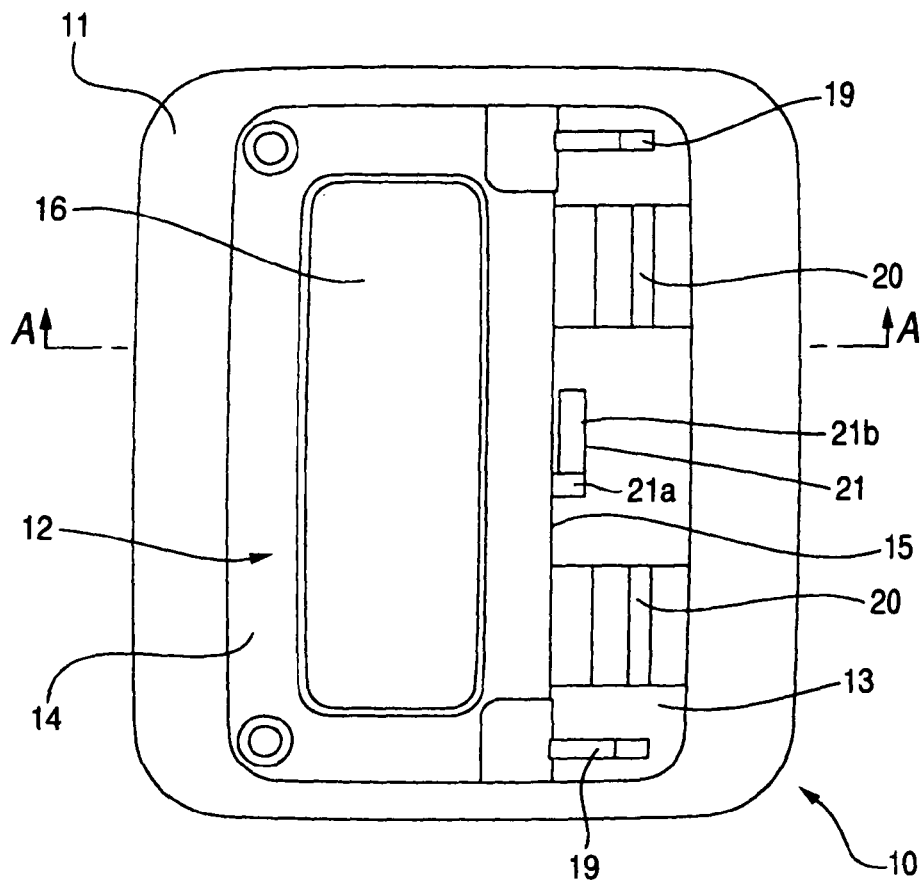
Figure 4B:
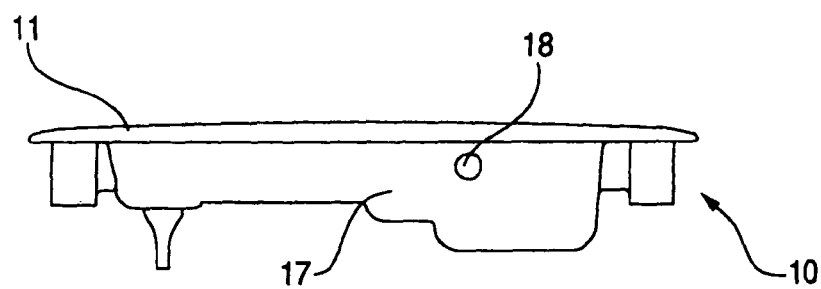
Figure 4C:
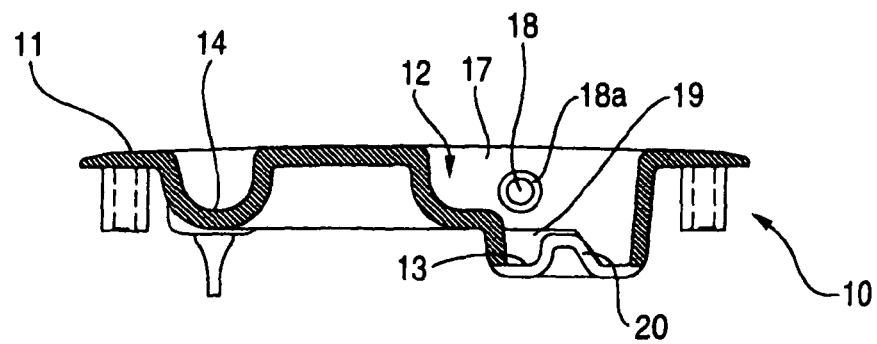
Figure 5A:
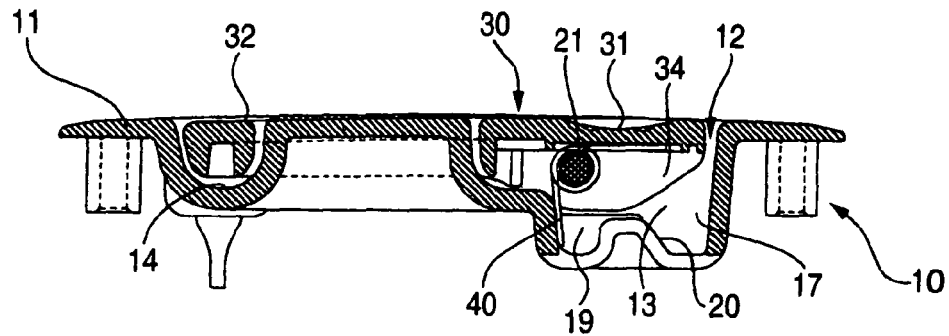

FIGS. 4A to 4C are development views showing the main body of the handle unit according to the embodiment, of which FIG. 4A is a top view, FIG. 4B is a side view and FIG. 4C is a sectional view taken along the line A-A in FIG. 5A.

As is shown in FIGS. 2 to 4C, a storage recess 12 is formed on the main body 10 of the handle unit in such a manner as to be recessed from a surface 11 thereof. In this storage recess 12, a front portion thereof is formed as a first recessed portion 13 which has a given depth for storing the proximal end portion 31 of the handle, and a rear portion thereof is formed as a second recessed portion 14 for storing the operating portion 32 of the handle 30 which is made shallower in depth than the first recessed portion 13. These first recessed portion 13 and second recessed portion 14 are formed continuously, and a stepped portion 15 is formed in a boundary portion therebetween. In addition, a bulge portion 16 is formed in the rear portion of the storage recess 12 in such a manner that a substantially central portion protrudes from the second recessed portion 14 to the same height as that of the surface 11 of the main body.

A pair of bearings 18 made up of through holes are opened in inner surfaces of both side walls 17 of the storage recess 12 which face each other at both ends of the first recessed portion 13. The rotational shafts 33, which will be described later, of the handle 30 are inserted into these bearings 18. In the embodiment, the bearings 18 are formed as through holes. However, the bearings 18 may be formed into concave or recessed grooves.

In addition, in this storage recess 12, a pair of holding walls 19 and a pair of rotation stoppers 20 are formed integrally in the first recessed portion 13, and furthermore, a spring support piece 21 is formed integrally on the stepped portion 15 between the first and second recessed portions 13, 14. The pair of holding walls 19 are formed, respectively, in positions which are spaced a given distance apart from the corresponding bearings 18 in such a manner as to be in parallel, respectively, with the side walls 17. On the other hand, the rotation stoppers 20 are each formed into a shape which protrudes from the first recessed portion 13 while being inclined at an arbitrary angle, so that a further rotation of the handle 30 is restricted through a contact between a proximal end of the handle 30 and the rotation stoppers 20. The rotation stoppers 20 define the operating position of the handle 30 to be pulled by a user.

As is shown in FIGS. 2 and 4B, in the spring support piece 21 which extends from the stepped portion 15, a base portion 21a extends from the stepped portion 15 of the main body 10, and furthermore, a cylindrical spring support portion 21b horizontally extends from a distal end of the support portion 21a, a distal end of the spring support portion 21b being made a free end. The spring support portion 21b is positioned on a straight line which passes through the pair of bearings 18, and a torsion coil spring 40 is mounted on the spring support portion 21b. The handle 30 is normally urged in a rotating direction directed from the operating position towards the stored position by the urging force of the torsion coil spring 40. In this embodiment, since the spring support piece 21 is formed integrally with the main body 10, the number of constituent parts is not increased.

Figure 5B:
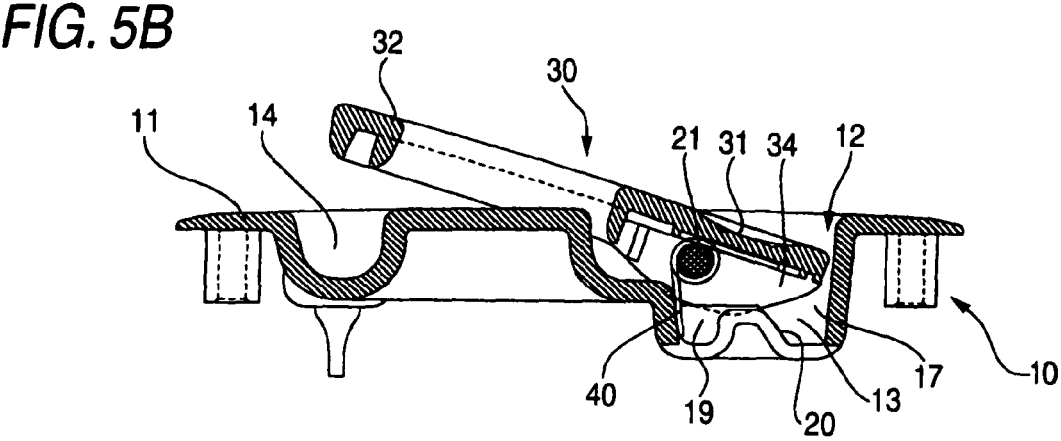
Figure 5C:
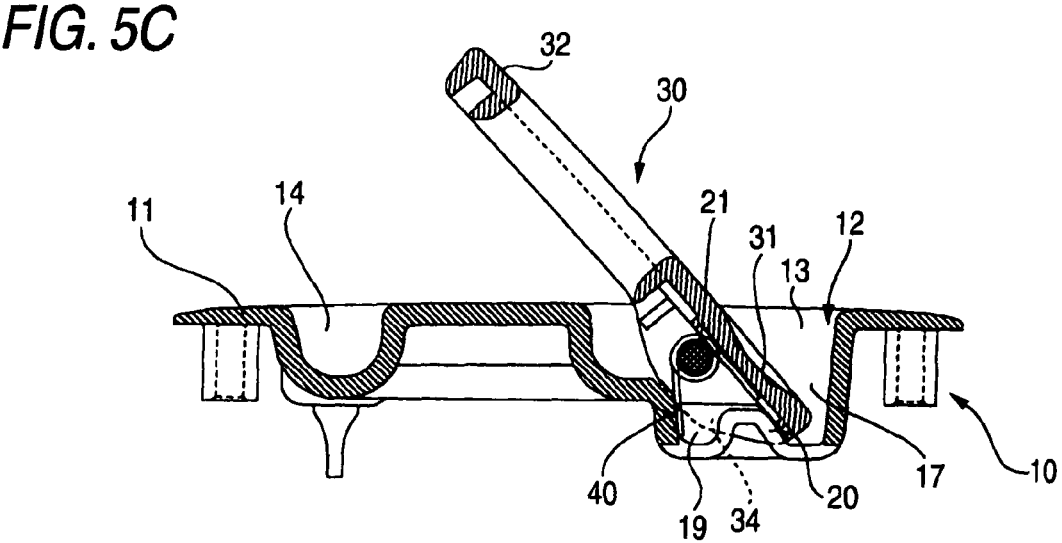

FIGS. 5A to 5C show sectioned side views showing rotating positions of the handle of the handle unit according to the embodiment, of which FIG. 5A shows the handle being in the stored position, FIG. 5B shows the handle being exposed or tilted up from the stored position, and FIG. 5C shows the handle being in the operating position.

As is shown in FIG. 5A, the support walls 34 and the holding walls 19 are set so as to not face each other, when the handle 30 is in the stored position. When assembling the handle 30 on the main body 10, firstly, the torsion coil spring 40 is mounted on the spring support piece 21 of the main body 10, and following this, the pair of rotational shafts 33 of the handle 30 are inserted into the corresponding bearings 18 from inside of the main body 10, whereby the handle 30 is assembled on to the main body 10 (refer to FIG. 2). As this occurs, since the support walls 34 of the handle 30 are brought into contact with the side walls 17 of the main body 10 to thereby generate deflection therein, by assembling the handle 30 onto the main body 10 while keeping the posture thereof so as to be in the stored position, the support walls 34 are prevented from interfering with the holding walls 19, and the rotational shafts 33 can be brought into engagement with the bearings 18.

In the handle 30 assembled on to the main body 10, the rotational shafts 33 are pivotally supported in the bearings 18 so that the handle 30 can rotate freely on the rotational shafts 33.

By lightly pushing the proximal end portion 31 of the handle 30, the handle 30 is rotated from the stored position, whereby the handle 30 can come out of the storage recess 12 (refer to FIG. 5B). After the handle 30 came out of the storage recess 12, the handle 30 is rotated to the operating position by being gripped at the operating position 32 thereof. The support walls 34 and the holding walls 19 are made to face each other when the handle 30 is in the operating position (refer to FIG. 5C).

Figure 6A:
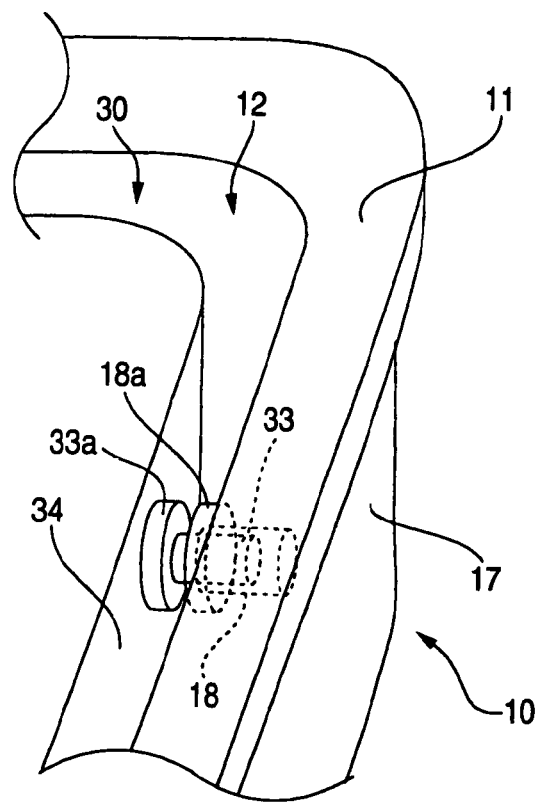
Figure 6B:
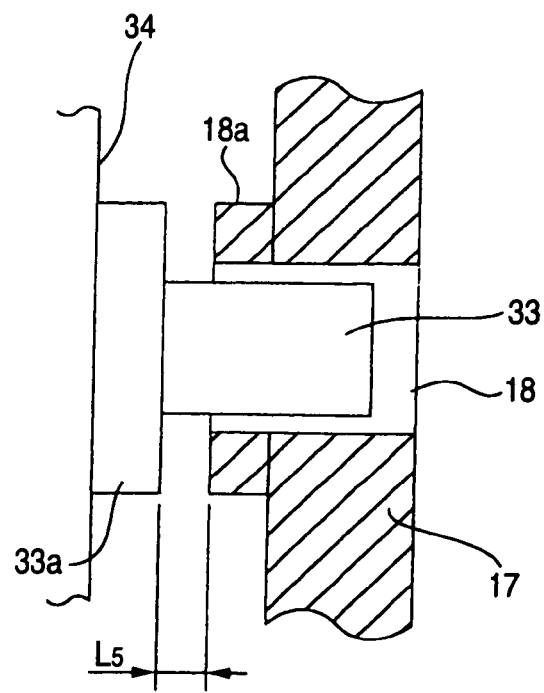

FIGS. 6A and 6B are drawings which depict a relationship between the rotational shaft and the bearing of the handle unit according to the embodiment, of which FIG. 6A is an enlarged perspective view, and FIG. 6B is an enlarged sectional view.

As is shown in FIGS. 6A and 6B, a flat bearing surface 33a is formed on the periphery of a proximal end of the rotational shaft 33 in such a manner as to protrude from an exterior side of the support wall 34. In addition, a flat bearing surface 18a is also formed on the periphery of the opening of the bearing 18 in such a manner as to protrude from an interior side of the main body. These bearing surfaces 18a, 33a are disposed to face each other when the handle 30 is assembled on to the main body 10. A play of the rotational shaft 33 in an axial direction thereof is regulated by a length L5 defined between these bearing surfaces 33a, 18a.

With the main body 10 and the handle 30 which are the molded resin products, the machining accuracy of portions corresponding to corner portions such as the periphery of the proximal end of the rotational shaft 33 and the periphery of the opening of the bearing 18 is reduced in general. Because of this, the handle 30 may be loosely assembled on to the main body 10 due to a gap being defined between the support walls 34 and the side walls 17 of the main body 10. In the embodiment, however, the flat bearing surfaces 18a, 33a are formed on the periphery of the proximal end of the rotational shaft 33 and the periphery of the opening of the bearing 18 in such a manner as to protrude therefrom so as to regulate the play of the rotational shaft 33 in the axial direction between the bearing surfaces 18a, 33a, whereby the play can be adjusted with high accuracy.

FIGS. 7A and 7B are enlarged sectional views depicting a relationship between the rotational shaft and the bearing when the handle of the handle unit according to the embodiment is in the operating position, of which FIG. 7A shows a state in which no external force is applied on the handle in a direction in which the handle is lifted upwards, and FIG. 7B shows a state in which an external force is applied on the handle in the direction in which the handle is lifted upwards.

As is shown in FIG. 7A, with the handle unit according to the embodiment, when the handle 30 is in the operating position, a length L1 defined between a side of the holding wall 19 which faces the support wall 34 and an inner side of the side wall 17 is set to be smaller than a length L2 from a side of the support wall 34 which faces the holding wall 19 to a distal end of the rotational shaft 33. In addition, looking at this from a different point of view, a length L3 defined between the facing sides of the holding wall 19 and the support wall 34 is set to be smaller than a length L4 over which the rotational shaft 33 is inserted into the interior of the bearing 18.

Then, when the handle 30 is gripped to lift up the trunk board 1, a strong external force is applied on a contacting point between the rotational shaft 33 and the bearing 18 in a direction in which the handle 30 is pulled upwards. The support wall 34 is deflected in a way as shown in FIG. 7B due to the external force being so applied, causing the rotational shaft 33 to attempt to come out of the bearing 18. However, since the lengths are set to satisfy L1<L2 and L3<L4 as has been described above, the support wall 34 is brought into contact with the holding plate 19 before the rotational shaft 33 comes out of the bearing 18, whereby a further deflection of the support wall 34 is restricted. Because of this, the rotational shaft 33 is prevented from being dislocated from the bearing 18.

In addition, as is shown in FIG. 7A, a length L5 defined between the respective bearing surfaces 18a, 33a which are formed on the peripheries of the rotational shaft 33 and the bearing 18 is set to be smaller than the length L3 defined between the facing sides of the holding wall 19 and the support wall 34. Consequently, even though the handle 30 shifts in the axial direction within the range of the length L5, the support wall 34 is never brought into contact with the holding wall 19, whereby the generation of wear due to contact of the side wall 34 and the holding wall 19 and striking noise due to collision of the walls can be prevented, thereby making it possible to obtain a good operability.

Note that the invention is not limited to the embodiment that has been described heretofore, and hence, the invention can, of course, be modified and/or altered variously without departing from the spirit and scope thereof. For example, the invention can be applied to the handle unit with the latch which is disclosed in U.S. Pat. No. 6,719,332.

As has been described heretofore, according to an aspect of the present invention, since the rotational shafts are formed integrally on the support walls of the handle, the number of constituent parts is reduced, and the assembling work and part management can be simplified, whereby the product costs can be reduced. Moreover, even though a strong pulling force is applied on the rotational shafts to generate deflection in the support walls, since the holding walls are brought into contact with the support walls from inside to regulate the deformation of the support walls, the rotational shafts are surely prevented from being dislocated from the bearings.

What is claimed is:

1. A handle unit comprising:
   a main body including:
   an inner wall;
   a pair of bearings that are formed on opposing sides of the inner wall, each bearing including a recess; and
   a pair of holding walls that are connected to the opposing sides of the inner wall so as to be separated from the pair of bearings, respectively;
   a handle including:
   a proximal portion;
   a pair of support walls that are formed on separated portions of the proximal portion; and
   a pair of rotational shafts that project outward from the pair of support walls, respectively, and are entered into the recesses of the pair of bearings to be engaged therewith, respectively,
   wherein the handle is mounted on the main body to be rotatable in a range from a stored position to an operating position,
   wherein, as viewed from a rotational axis direction of the rotational shafts, the pair of holding walls and the pair of support walls respectively do not overlap each other when the handle is in the stored position, and respectively overlap each other when the handle is in the operating position,
   wherein, when no force is applied onto the handle, a gap is defined between the pair of holding walls and the pair of support walls, and
   wherein, in a state where the handle is in the operating position, when the proximal portion deflects in accordance with a lifting-up force sufficient to cause a deflection of the proximal portion applied onto the handle, the pair of the support walls are moved inwardly to respectively contact the pair of holding walls to thereby prevent disengagement of the pair of rotational shafts from the recesses of the pair of bearings.

2. The handle unit according to claim 1, wherein a length between each holding wall and a side of the inner wall is set smaller than a length from each supporting wall at a side facing the corresponding holding wall to a distal end of the corresponding rotational shaft.

3. The handle unit according to claim 1, wherein a length between each support wall and the corresponding holding wall is set smaller than an inserted amount of each rotational shaft into the corresponding bearing.

4. The handle unit according to claim 1, wherein a length between each support wall and the corresponding holding wall is set larger than a length from a proximal end of each rotational shaft to the corresponding bearing.

5. The handle unit according to claim 1, wherein the main body and the handle are mold-formed of a resin, wherein, on the support wall, a first bearing surface having a flat shape is formed to surround a proximal end of the rotational shaft, and wherein, on the inner wall, a second bearing surface having a flat shape is formed to surround a periphery of the bearing.

6. The handle unit according to claim 1, wherein the main body includes a spring support piece that is formed with the main body to intersect with a center axis of the pair of bearings.

7. The handle unit according to claim 1, wherein, when the lifting-up force sufficient to cause a deflection of the proximal portion is applied onto the handle in the operating position, the support walls inwardly deflect so that the rotatational shafts move inwardly.

8. The handle unit according to claim 1, wherein, when the lifting-up force sufficient to cause a deflection of the proximal portion is applied onto the handle in the operating position, the support walls are deflected so that inner surfaces of the support walls contact outer surfaces of the holding walls.

9. The handle unit according to claim 1, wherein the holding walls are positioned inwardly with respect to the support walls.

10. The handle unit according to claim 1, wherein the pair of rotational shafts are integrally formed with the pair of support walls.

11. The handle unit according to claim 1, further comprising:
   a storage recess formed in the main body; and
   at least one rotation stopper formed within the storage recess.

12. The handle unit according to claim 11, wherein the at least one rotation stopper protrudes from the storage recess at an angle.

13. The handle unit according to claim 1, wherein a gap is disposed between the inner wall and the support walls.

14. A storage compartment comprising:
a base board; and
a handle unit attached to the base board, the handle unit comprising:
  a main body including:
    an inner wall;
    a pair of bearings that are formed on opposing sides of the inner wall, each bearing including a recess; and
    a pair of holding walls that are connected to the opposing sides of the inner wall so as to be separated from the pair of bearings, respectively; and
  a handle including:
    a proximal portion;
    a pair of support walls that are formed on separated portions of the proximal portion; and
    a pair of rotational shafts that project outward from the pair of support walls, respectively, and are entered into the recesses of the pair of bearings to be engaged therewith, respectively,
  wherein the handle is mounted on the main body to be rotatable in a range from a stored position to an operating position,
  wherein, as viewed from a rotational axis direction of the rotational shafts, the pair of holding walls and the pair of support walls respectively are other than overlapping each other when the handle is in the stored position, and respectively overlap each other when the handle is in the operating position,
  wherein, when no force is applied onto the handle, a gap is defined between the pair of holding walls and the pair of support walls, and
  wherein, in a state where the handle is in the operating position, when the proximal portion deflects in accordance with a lifting-up force sufficient to cause a deflection of the proximal portion applied onto the handle, the pair of the support walls are moved inwardly to respectively contact the pair of holding walls to thereby prevent disengagement of the pair of rotational shafts from the recesses of the pair of bearings.

15. The storage compartment according to claim 14, wherein, when the lifting-up force sufficient to cause a deflection of the proximal portion is applied onto the handle in the operating position, the support walls inwardly deflect such that the rotational shafts move inwardly.

16. The storage compartment according to claim 14, wherein, when the lifting-up force sufficient to cause a deflection of the proximal portion is applied onto the handle in the operating position, the support walls are deflected so that inner surfaces of the support walls contact outer surfaces of the holding walls.

17. The storage compartment according to claim 14, wherein the holding walls are positioned inwardly with respect to the support walls.

* * * * *